United States Patent
Pike, Sr.

(10) Patent No.: US 9,254,490 B2
(45) Date of Patent: *Feb. 9, 2016

(54) PROCESS FOR TREATING FLY ASH AND A ROTARY MILL THEREFOR

(71) Applicant: VHSC, LTD., Tortola (VG)

(72) Inventor: Clinton Wesley Pike, Sr., Montgomery, TX (US)

(73) Assignee: VHSC, LTD., Tortola (VG)

(*) Notice: Subject to any disclaimer, the term of this patent is extended or adjusted under 35 U.S.C. 154(b) by 700 days.

This patent is subject to a terminal disclaimer.

(21) Appl. No.: 13/647,838

(22) Filed: Oct. 9, 2012

(65) Prior Publication Data

US 2014/0096705 A1 Apr. 10, 2014

(51) Int. Cl.
| | |
|---|---|
| *B02C 17/20* | (2006.01) |
| *B02C 17/00* | (2006.01) |
| *B02C 23/06* | (2006.01) |
| *C04B 28/04* | (2006.01) |
| *C04B 28/06* | (2006.01) |
| *C04B 7/26* | (2006.01) |
| *C04B 20/02* | (2006.01) |

(52) U.S. Cl.
CPC ............. *B02C 17/00* (2013.01); *B02C 17/20* (2013.01); *B02C 23/06* (2013.01); *C04B 7/26* (2013.01); *C04B 20/026* (2013.01); *C04B 28/04* (2013.01); *C04B 28/06* (2013.01); *Y02W 30/92* (2015.05)

(58) Field of Classification Search
CPC .... B02C 19/00; B02C 19/0056; B02C 23/00; B02C 23/06; B02C 17/00; B02C 17/20; B24B 31/00; C04B 14/36; C04B 12/00
USPC .......... 241/30, 176, 184, 26, 3; 106/692, 705, 106/405

See application file for complete search history.

(56) References Cited

U.S. PATENT DOCUMENTS

| | | | |
|---|---|---|---|
| 2,021,623 A | 11/1935 | Breerwood | |
| 2,564,690 A | 8/1951 | Havelin et al. | |
| 3,565,648 A | 2/1971 | Mori et al. | |
| 3,852,084 A | 12/1974 | Webster et al. | |
| 4,018,619 A | 4/1977 | Webster et al. | |
| 4,054,463 A | 10/1977 | Lin | |
| 4,482,096 A | 11/1984 | Lin | |
| 4,679,736 A | 7/1987 | Orlando | |

(Continued)

FOREIGN PATENT DOCUMENTS

| | | |
|---|---|---|
| CN | 1974465 A | 6/2007 |
| CN | 100412020 C | 8/2008 |

(Continued)

OTHER PUBLICATIONS

Kosmatka et al, Design and Control of Concrete Mixtures, Portland Cement Association, 2003 pp. 21-70, 79-127.

(Continued)

*Primary Examiner* — Mark Rosenbaum
(74) *Attorney, Agent, or Firm* — Hayes Soloway, PC (57) ABSTRACT

A process for treating fly ash to activate the fly ash so that it may be used as a substitute for Portland cement, with the process including the use of a specialized rotary mill having variably sized and shaped media to increase the surface area of one fly ash component by grinding, avoiding milling a second fly ash component, while roughing up the surface of the second component to increase its surface area.

20 Claims, 4 Drawing Sheets

(56) References Cited

U.S. PATENT DOCUMENTS

| | | |
|---|---|---|
| 4,887,773 A | 12/1989 | Mehltretter |
| 5,988,396 A | 11/1999 | Minkara et al. |
| 6,634,576 B2 | 10/2003 | Verhoff et al. |
| 6,730,161 B2 | 5/2004 | Lakshmanan et al. |
| 6,802,898 B1 | 10/2004 | Liskowitz et al. |
| 6,936,098 B2 | 8/2005 | Ronin |
| 7,240,867 B2 | 7/2007 | Ronin |
| 7,323,021 B2 | 1/2008 | Trass et al. |
| 7,669,790 B2 † | 3/2010 | Ronin |
| 7,931,220 B2 | 4/2011 | Grasso, Jr. et al. |
| 8,051,985 B2 | 11/2011 | Matsuo et al. |
| 8,967,506 B2 * | 3/2015 | Pike, Sr. .................. C04B 7/26 241/30 |
| 2004/0247846 A1 | 12/2004 | Uzawa et al. |
| 2005/0005823 A1 | 1/2005 | Gourley et al. |
| 2006/0201395 A1 | 9/2006 | Barger et al. |
| 2007/0034118 A1 | 2/2007 | Jardine et al. |
| 2008/0308659 A1 | 12/2008 | Grasso, Jr. et al. |
| 2009/0188998 A1 | 7/2009 | Anderson et al. |
| 2012/0280069 A1 | 11/2012 | Pike, Sr. |

FOREIGN PATENT DOCUMENTS

| | | |
|---|---|---|
| CN | 103056001 A | 4/2013 |
| CN | 103113088 A | 5/2013 |
| EP | 1688182 A1 | 8/2006 |
| RU | 2388710 C1 | 5/2010 |
| WO | 2009064244 A1 | 5/2009 |
| WO | 2014004943 A1 | 1/2014 |

OTHER PUBLICATIONS

N. Bouzoubaâ, Mechanical properties and durability of concrete made with high-vol. fly ash blended cements using a course fly ash, Cement and Concrete Research, vol. 31, pp. 1393-1402 (2001).†

N. Bouzoubaâ, The effect of grinding on the physical properties of fly ashes and a Portland cement clinker, Cement and Concrete Research, vol. 27, No. 12, pp. 1861-1874 (1997).†

\* cited by examiner
† cited by third party

PROCESS FOR TREATING FLY ASH AND A ROTARY MILL THEREFOR

FIELD OF THE INVENTION

This invention relates to activation of fly ash for use as a substitute for Portland cement in the manufacture of concrete and more particularly to treatment of fly ash in a specialized rotary mill having variably sized and shaped media combinations to reduce the size of one component while avoiding milling a second component, or providing a surface treatment for the second component such that the mill can treat multiple components differently.

BACKGROUND OF THE INVENTION

It has long been a desire of the cement concrete industry to place as much inexpensive pozzolan in a concrete mix as possible to minimize the amount of expensive Portland cement and not lose any of the attributes of the concrete such as setting time, initial strength, final hardness and durability. Specifically it is a goal to achieve concrete replacing as much Portland cement with supplementary cementitious materials such as fly ash slag or other materials as possible while minimizing or eliminating the use of Portland cement.

The goal is to make 100 slag grade or better concrete or 1157 performance cement using materials less costly than Portland cement. Regardless of the cost of pozzolan and Portland cement, over the years it has been found that pozzolan concrete has the best performance record as compared with Portland concrete, with the pozzolan concrete out-performing the Portland concrete with regard to sulfate attacks and alkaline silicon reactivity (ASR) attacks.

It will be appreciated that fly ash is part of the pozzolan family and that when one can replace Portland cement with as much as 20% Class F fly ash or 30% Class C fly ash, one obtains a very durable high strength concrete at considerably less than the price of Portland cement concrete Specifically if it were possible to utilize granulated blast furnace slag, then it has been found that one can replace 50 to 80% of the Portland cement with this granulated blast furnace slag. However, granulated blast furnace slag is not always available or is too costly. If one has granulated blast furnace slag available the strength of the concrete approaches or equals ASTM C989 slag grade 100, whereas using untreated fly ash pozzolan has difficulty for qualifying for slag grade 80.

It will be appreciated that slag grade 100 refers to the fact that in 7 days one has achieved 75% strength for the Portland cement concrete, whereas in 28 days one achieves 95% strength.

It is therefore important to be able to process fly ash pozzolan to react on a level equal to that or better than that of granulated ground blast furnace slag.

In order to achieve 100 slag grade performance, or even 120 slag grade performance, the first requirement is to get the overall particle size distribution of the Class F fly ash down to under 45 microns, meaning that 98% or more of the Class F fly ash is under 45 microns in diameter. A better indicator is surface area. The surface area that is typical for fly ash pozzolan is around 0.695 m2/g. If it were possible to treat/mill pozzolan having a surface area of 0.695 m2/g to increase its surface area to 0.914 m2/g one could achieve slag grade 100 performance, or grade 120 slag pozzolan with around a 1.263 m2/g surface area or higher Given that various fly ashes have different surface areas one must move the surface area from its beginning surface area to increase it by a minimum of around 38% but preferably over 90% or higher from the parent sample of pozzolan including the additives.

How this is accomplished with the subject mill will be discussed hereinafter. As will be seen, the surface areas measured using a Beckman Coulter SA 3100 compressed helium/nitrogen Single Point BET analyzer show a significant increase when using the subject rotary mill. Moreover, when the pozzolan is treated in the subject rotary mill and when Limestone power station fly ash was tested using ASTM C 989 testing, the 0.693 m2/g Surface Area (SA) pozzolan yielded Slag Grade 80 performance; whereas 0.914 m2/g yielded Slag Grade 100 performance and the 1.263 m2/g yielded Slag Grade 120 performance when all were mixed with the same additive package as described hereinafter.

When one obtains ground fly ash at around 0.9 m2/g surface area (SA) one has components in the fly ash that are either reduced in particle size or the surface area is roughed up to increase its reactivity, thus allowing more reactive pozzolans to get into the chemical reaction of the concrete. Generally 80 micron or larger unground particles do not react unless they are ground down. It is generally accepted that the lower the pozzolans fineness (−45 micron) the more reactive the overall pozzolan will be while still meeting the ASTM C618 requirements.

Pozzolans come unground and consist generally of aspherical particles and spherical particles in the form of alumino ferro silicate glass beads. The treatment to be described both reduces the size of the non-spherical particles while at the same time roughing up the spherical particles. This allows for a much higher surface area with no reduction in the flow ability of the pozzolan and results in a concomitant rise in reactivity, going from a base of not meeting Slag Grade 80 performance to Grade 120 performance for a class F fly ash.

The performance used to measure class f fly ash is ASTM C618 which usually measures the pozzolanic activity index by testing a 20% pozzolan to cement mixture versus the slag requirement of a 50% pozzolan to cement mixture. Unless the pozzolan is treated using the subject process untreated fly ash pozzolan usually cannot pass Slag Grade 80 testing requirements.

It is thought that the smaller the particle size the higher the reactivity. Moreover, if fly ash can be ground down to under 45 microns one can air classify the material to select out the finer particles. In the air classification process one takes out the oversized particles, leaving the finer particles to provide the chemical reaction. However by having to remove the larger particles and dispose of them there is wastage, both in terms of material and energy expended. It would therefore be desirable to be able to grind down all of the Class F fly ash or pozzolan such that over 90% under is 25 microns, or if one could not grind down the fly ash sufficiently one would nonetheless like to be able to activate the surface of the fly ash to be able to make quality concrete.

While those in the cement/concrete industry have utilized large roll mills and ball mills for crushing pozzolans, these mills do not create activated particles both because merely crushing pozzolan does not polish or grind it and because the residence time in such mills is quite short. Typically in the crushing of pozzolans, the residence time is between 3 and 10 seconds because these types of mills are not grinding on the surfaces of the particles but rather splitting them apart by impact of the pozzolan particles on a rib or other projection where the particle is broken apart. Thus, the actual work that is being done on the surface of a particular particle is exceedingly short because those utilizing the large ball mills are simply trying to break apart the larger particles and not focusing on providing reactivity enhanced smaller particles having increased surface areas. Thus even if the larger ball mills could produce particles under 45 microns in diameter they nonetheless do not provide activated particles that the subject treatment to be described does. Moreover, chemical additives that are put in the process help activate the now receptive higher surface area pozzolan.

In short, all of the pozzolan milling to date has concentrated on fracturing the particles and not grinding them down or polishing them.

SUMMARY OF INVENTION

In order to get the pozzolan to act on a level equal to or better than granulated blast furnace slag, or even to achieve slag grade 120 performance, a specialized rotary mill provides activated fly ash particles whose surface area is increased by as little as 30% to as much as 90% or higher. At the same time the fly ash particles are interground with lime so they are coated with calcium. When the interground lime coated mill-processed fly ash particles are interground with non-lime coated fly ash particles in the subject mill at 4-10% by weight of lime coated fly ash particles, slag grade 100 performance can be achieved. When adding other additives, the performance can be increased to slag grade 120.

To increase the surface area of untreated pozzolan the subject rotary mill employs different sizes and shapes of ceramic media and increases the residence time of the pozzolan particles to 30 minutes or longer in a batch process. It has been found that if the initially treated material can be left in the mill and ground down to a total surface area of around 1.263 m2/g or higher when starting at 0.695 m2/g, one can increase the surface area of all particles and especially the spherical particles.

In summary, the surface area of both non-spherical and spherical particles can be increased by grinding the non-spherical particles and by roughing up the surface of the spheres. Both types of particles are treated in the subject mill using a tailored mix of ceramic media. Thus, while one is not actually fracturing the small spherical particles, the subject mill is nonetheless beating them up utilizing the tailored media so as to increase the surface area of the small spherical particles to activate them while at the same time grinding non-spherical particles to a smaller and smaller diameter to provide increased and now reactive surface area.

The net result is that the pozzolan can be ground down and/or roughed up to a surface area of 0.914 m2/g or higher to obtain grade 100 or 120 slag performance. Thus Class F fly ash can be greatly enhanced simply by milling it using the subject mill to a point where it is much more reactive as opposed to being less than a Grade 80 Slag performance pozzolan.

In one embodiment, when adding as little as 4% of this processed fly ash that has been interground with Quicklime at a ratio of 85% pozzolan to 15% quicklime and then intergrinding this mixture with pozzolan in the subject mill, with other additives one can obtain a minimum slag grade 100 performance, or even slag grade 120 performance.

As mentioned above, the use of the subject rotary mill produces activated particles that when mixed with a Quicklime additive that is then interground with pozzolan at the 4% by weight of the Pozzolan or higher, at least slag grade 100 performance results. Further with the addition of high range polycarboxylate water reducers in powder form, one can achieve slag grade 120 performance.

It has been found that the polycarboxylate high range water reducer will react with the mill-treated pozzolan at rates as low a 0.1% by weight and still give strength to mill-treated Class F fly ash with only the lime additive and no Portland Cement. This indicates the reaction with the now high surface area amorphous glass and ground down non-spherical particles is unique.

Moreover, the bound calcium on the surface and/or now ground down with the non-spherical particles reacts much quicker than normal pozzolanic reactions do.

Additionally another treatment that now can be used with the 1.2 m2/g or higher surface area pozzolan is the addition of a small amount of calcium aluminate cement with an interground lithium powder at 0.1-0.2% to attain slag Grade 120 performance without the Lime additive. This mixture is added at 2% or less by weight to mill-treated pozzolan that increases the surface area to 1.263 m2/g to attain slag grade 120 and beyond.

All of the above is made possible by the utilization of the subject rotary mill utilizing a tailored mix of differing media to provide multi-media grades. In one embodiment this involves the following mixture: ½ cylindrical ceramic; ¼ cylindrical ceramic; ¾ inch cone shaped ceramic; and 8 mm beads. In another formulation one uses a mixture of a ⅝ inch cylinders with ¾ inch cones and ⅛ inch cylinders. It has been found that many other media combinations work and that the residence time to achieve the 1.263 m2/g or higher surface area can be lowered from for instance 1 hour to less than 45 minutes as the media is matched to the particular pozzolan being treated. The net result is that by using the subject mill and the multi-media one can dramatically increase the overall surface area to increase reactivity.

More particularly, it has been found that by utilizing these different form factors and sizes of media in this rotary mill one can selectively grind down and activate non-spherical pozzolan particles while at the same time taking the spherical particles that exist and increasing their surface area. Thus, by selection of the media and their weight to provide a tailored mix within the rotary mill, one can selectively reduce the size of one component while avoiding milling the second component; or alternatively one can reduce the size of one component while surface treating a second component. Thus, the mill can treat multiple components differently depending on the mix of the different media in the mill and the configuration thereof.

In one embodiment, three different medias are blended together in the media bed for the mill such that pozzolan particles in the mill stay in the mill and are constantly being hit by some of this media and constantly being hit by other media. If the mill is allowed to run for 30 minutes before the mill is evacuated, then first and foremost the residence time of the material in the mill can be extended beyond the typical one minute residence time of the large roll mills.

It will be appreciated that the above mill is a dry processing mill and is quite unlike vibrating ball mills which require significant amounts of energy to operate and significant hydraulics and mass. It is noted that vibrating ball mills have an enclosure that is fed with product to be ground and has a bed of balls and media that sits on a vibrating table having two 50-75 horsepower motors that cause the mills to shake up and down. These mills typically can only provide 10 seconds residence time and with even the most advanced of these vibrating mills, they can provide at most a two minutes, residence time. As will be appreciated this residence time is not nearly enough time to provide activated Class F fly ash particles and when one tries to choke the mill down further one loses production rate. Moreover, because the vibrating ball mill has a huge hydraulic system, maintenance is significant.

It has been found that if one can process fly ash with the subject small rotary mill one can integrand or blend in just 4% of this processed lime coated fly ash to achieve slag grade 100 performance. With additional additives such a polycarboxylate high range water reducer or activated calcium aluminate it has been found that one can regularly achieve slag grade 120 performance.

If one starts with typical fly ash that consists of a mixture of spherical and non-spherical particles having a surface area around 0.695 m2/g and if one adds this type of starting material to the subject mill, the mill acts to comminute the small particles or grind them down to 25 microns or less while at the same time selectively roughing up the surfaces of small spherical particles. Both of these independent processes activate the separate components of the fly ash and increases the combined surface area to 1.263 m2/g or higher. Thus, the mill serves the purpose of grinding down non-spherical particles while at the same time not fracturing the small spherical ferro alumina silicate glass bead particles, but rather creates a roughed up surface on these particles that increases the surface area allowing the reacting materials on the surface of the glass beads to react with calcium or calcium compounds.

The important finding of the subject invention is that the starting surface area needs to be increased by a minimum of 30% for slag grade 100 or 70% or higher for slag grade 120. Note, each pozzolan can be different. For example the surface area in one test one run started at 1.15 m2/g but when finished with processing with additives had a surface area of 1.986 m2/g.

Thus the key to the subject invention is that the starting surface area for the pozzolan has to be increased by the above percentages, and is not necessarily related to a set specific surface area. This along with the polycarboxylate high range water reducer causes a pozzolanic cementitious reaction that gains some strength without the addition of Portland Cement when using Class F fly ash such as produced at the Limestone Power station in Jewett Tex. When slag pozzolans replace 50% up to 80% of the Portland cement in a concrete mix and with the correct surface area and the lime additive at 4% or higher of the activated pozzolan, one can achieve 1.5-2 hours set time, typical of Portland cement concrete, and surface areas gains as detailed below

TABLE I

| m2/g BET surface area | Limestone fly ash | Mundra fly ash | Utlra tech fly ash |
| --- | --- | --- | --- |
| Raw | 0.695 | 1.158 | 0.985 |
| Roto milled | 0.914 | | |
| VBM milled | 0.703 | | |
| Rotomilled w/additive | 1.263 | 1.986 | 1.318 |
| diff | 0.568 | 0.828 | 0.333 |
| % change | 81.72 | 71.5 | 33.80 |

Now what one can see is with the higher surface area change the easier one can impact it with the additive to achieve 70%+ increase in surface area. Assuming additive 1 is fly ash interground with a calcium additive, that additive 2 includes a polycarboxylate high range water reducer, HRWR, and that additive 3 includes calcium aluminate cement premixed with lithium, then one only needs 4% of the additive 1 and 0.175% of the additive 2. If the surface area changes less than 33% one adds more of the calcium additive to help it reach Grade 120, for instance 8%, or one leaves it at 4% and has Grade 100 performance. With the higher surface area changes one can make Grade 120 with only 4% of the additive.

Also notice the surface area difference available when using a standard vibrating ball mill or the subject Roto Mill. Using the same starting material the subject Roto mill move the surface area up 31.5% while the standard vibrating ball mill moves the surface area up only 1.1%.

Having provided the activated pozzolan particles, fibers can be added to roughed up spheres and activated non-spherical fly ash to further increase performance. The use of polypropelene fibers in concrete is well known. However; what has been discovered is that using only a ¼ inch in length and 0.05 mm in diameter fiber at 0.2% by weight to the treated and chemically added pozzolans, these short fibers can be blended with the now fine pozzolan powder mix to further increase the flexibility and compressive strength of the mortar component of the concrete mix, thus increasing specific properties of the concrete using the activated pozzolans. This short of a fiber is typically not used in concrete, as usually a much longer fiber 1 inch to 3 inches is employed to increase the performance of the concrete. These long fibers are usually added to the concrete batch and mixed in a batch mixer or thrown in to a drum mixer used to deliver the Ready Mix concrete.

When using the specialized mill and activated pozzolan, the short fibers are mixed with the treated pozzolan and delivered to the customer in the powder before the powder is mixed with sand, aggregates, water, Portland Cement, and the admixes used to make concrete. By adding these fibers one achieves a 25% increase in compressive strengths over a non fiber sample. Note in one embodiment the fiber addition ratio in the powder is 0.2%.

Moreover, in addition to the polycarboxylate high range water reducer helping to activate the calcium activity in the pozzolan, it primarily serves to lower the amount of water used to obtain flow in mortar or concrete. When the polycarboxylate is added at very low amounts to the powder, the additional property gained is that it lowers the amount of water needed to get the desired slump or viscosity in the mortar/concrete. Thus, by utilizing the subject technique one can make concrete with a lower amount of water in it. Lower water cement ratios in concrete result in better lasting concrete. The better performance is the result of having filled pores that were originally filled with water rather with very small reactive particles. This results in higher strength. In short, with a higher solids content it is less likely that water can permeate through the concrete, with the result that issues like sulfate attack and alkaline silicate reactivity are greatly reduced due to its impermeability. The more water impermeable one makes the concrete the better the concrete is going to last along, along with longer term durability.

In summary, what is provided is a rotary mill with a media bed comprised of differently sized and shaped media components to process pozzolan to obtain at least a 30% increase in surface area such that when combined with untreated pozzolan has an increased activity to achieve slag grade 100 or better performance, given the addition of additives including interground lime coated pozzolan. Other additives include a polycarboxylate HRWR and in some instances calcium aluminate cement mixed with lithium. The increased surface area is provided by the rotary mill due to a tailored mix of media that grinds down non-spherical particles and roughs up surface of the amorphous glass beads, thus to increase their reactivity, with the mill media operating differently on the non-spherical pozzolan and the spherical pozzolan, i.e. by crushing in one case and polishing in the other case. The reactivity of either the non-spherical ground pozzolan or the spherical pozzolan is used in combination with other chemical additives to achieve a slag grade 100 or better performance.

BRIEF DESCRIPTION OF THE DRAWINGS

These and other features of the subject invention will be better understood in connection with the Detailed Description in conjunction with the Drawings of which.

DETAILED DESCRIPTION

Figure 1:
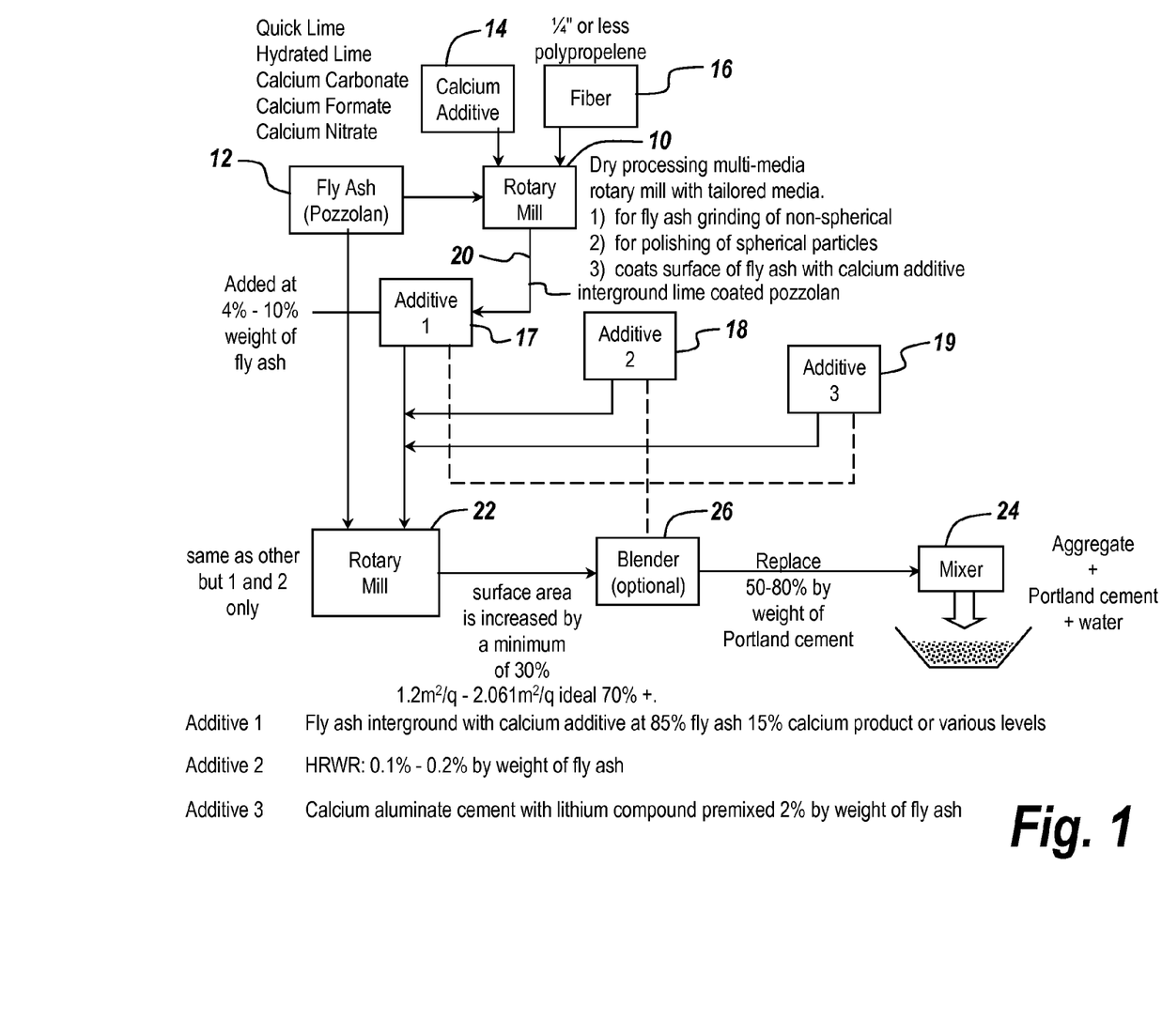
FIG. 1 is a block diagram of a process for treating fly ash utilizing a small rotary mill.

Referring to FIG. 1 in one embodiment the subject rotary mill 10 is provided with fly ash pozzolan 12 along with a calcium additive 14 and optionally fiber 16. The calcium additive may be either quick lime, hydrated lime, calcium carbonate, calcium formate or calcium nitrate or any calcium bearing compound.

Rotary mill 10 provides dry processing multimedia, with the rotary mill having a tailored media composition specific for grinding non-spherical fly ash particles, for polishing spherical particles and further to coat the surface of the fly ash with the calcium additive. The result is an interground lime coated pozzolan which is available as an additive 17 on feedline 20 that consists of an additive in which fly ash is interground with calcium. In one embodiment the additive 17 consists of 85% fly ash and 15% calcium product.

This activated lime-coated fly ash additive is added at 4-10% by weight of fly ash to a second rotary mill 22 to which is supplied the raw fly ash 12 from a supply. It will be appreciated after milling by rotary mill 22 the total surface area is increased by a minimum of 30% such that when the output of rotary mill 22 is supplied to a mixer 24 and is mixed with aggregate, Portland cement and water, a concrete is formed having at least a slag 100 performance.

It will be appreciated that it is advantageous to use the output of rotary mill 10 without further additives because the total surface area of the fly ash is dramatically increased.

However, to further increase the reactivity of the fly ash, in one embodiment a second additive 18 comprising a polycarboxylate high range water reducer, in powder form at 0.1%-0.2% by weight of fly ash further increases the reactivity of the fly ash. This second additive is added to rotary mill 22 which when interground with fly ash 12 provides an even better reactivity for the activated fly ash to be mixed at 24.

It will be noted that rather than adding Additive 2 to Additive 1 in rotary mill 22, the output of rotary mill 22 with Additive 1 can be supplied to a blender 26 which blends the fly ash that has been interground with Additive 1 and blends it with Additive 2.

Moreover, it is possible to provide even further reactivity by providing a further additive 19, namely Additive 3, to rotary mill 22, with Additive 3 comprising calcium aluminate cement with a lithium compound premixed in one embodiment to approximately 2% by weight of fly ash.

Again, rather than adding Additive 3 to rotary mill 22, one can likewise take the output of rotary mill 22 which intergrinds Additive 1 and Additive 2 with fly ash and blend it with Additive 3 at blender 26.

As illustrated, the output of rotary mill 22 whether through blender 26 or not replaces 50-80% by weight of Portland cement in mixer 24 to provide as much as a slag grade 120 performance.

It will also be appreciated that while two identical rotary mills are shown at 10 and 22, rotary mill 10 may be used again to intergrind Additive 1 which it has previously generated with fly ash and further additives such as Additive 2 and Additive 3, rather than having to provide two separate rotary mills.

The net result of the combinations described above is a minimum increase in surface area of 30% to a maximum increase in surface area of about 70%, with the surface area increase providing for the ability to utilize fly ash as a replacement for expensive Portland cement in the manufacture of concrete.

With respect to the specialized mill itself, rather than utilizing various types of mills such as a ball mill, a hammer mill, a vibrating mill, a roller mill or numerous other types of mills, the subject rotary mill works off a simple drum design that rotates at a predetermined speed and has inside it a tailored mix of media as previously described so that one can load the specialized rotary mill, process the pozzolan and exit the processed pozzolan without ever having to stop the rotation of the mill, just slowing it to an optimized rotation for emptying.

In one embodiment, the product is introduced into a port, at which point the mill is started up and is rotated between for instance 20 and 40 RPM. In one embodiment, the cylinder is has a 6 foot diameter and a length of 10 feet; and has a hose fitting at each end on a swivel bearing that allows the drum to rotate while at the same time permitting introduction of air on one side and product evacuation from the other side while the mill is still rotating. Air is introduced to force the mill products out the exit port through a specially slotted discharge plate. Once the desired milling has been achieved it takes about 10 to 15 minutes to evacuate the mill, depending on the initial charge of the mill at which point it is reloaded.

As to the media content of the mill, the mix of the media is important in terms of the gradations and the specific processing that is to be done by the mill. In one embodiment, the mix of the media is one-half inch cylinders and one-eighth cylinders to which may be added five-eighth cylinders in various combinations. It is noted that if two media are used, for instance a five-eighth cylinder and a one-half inch cylinder, then one might have to rotate the mill an hour in order to get the desired grind. However, if a one-eighth cylindrical media is also introduced, then the grinding time can be reduced to 15 minutes. Note, in one embodiment the mill is filled up with up to one-half of its volume with media, whereas the product to be milled completes the filling to approximately two-thirds of the volume of the mill.

It has been found that by using charges of different sizes of media, presently ceramic cylinders, i.e. 1 inch at 400 pounds, ½ inch at 400 pounds vs. ¼ at 800 pounds or other combinations of sizes that one can obtain better efficiency for the processing of the fly ash.

Additionally, it has also been found that one can actually reduce the overall particle size of the total material from for instance 200 microns top size and 25 microns avg to 75 microns top size and to a mean diameter of 12 microns.

Moreover, the reduction in size of aspherical particles or irregularly shaped slag or sand or molten particles formed in the burner of a coal fired power plant is dramatic. Further, as mentioned above, spherical shaped amorphous glass bead particles are not reduced in size but are impacted on the surface, to increase surface area. Moreover, all of the non-spherical particles and a small amount of the spherical particles, being cenospheres, or low strength spheres for instance 3,000-5,000 PSI crush strength, are reduced nominally to under 25 microns from for instance a starting size of 200 microns. The milling still allows the material that has been processed to obtain good flowability when tested in mortar mixes with a small amount of water reducer used in concrete and tested in the same manner.

In short, in one embodiment the increase in surface area in the pozzolan of 73% from 0.695 to 01.263 m2/g increases the reactivity of the fly ash when further treated with the above additives by allowing material that is in its natural state when formed in a furnace to become cementious when ground down and exposed to calcium and other admixtures such as specific carboxylates. The increase in surface area acts to accelerate most cementious reactions of the fly ash and greatly increases the activity of the overall fly ash versus a non-ground down fly ash, non-surface ground spheres and non-carboxyalte treated pozzolan.

Moreover, it has been discovered that a specific carboxylate can activate the right kind of fly ash, namely Class F fly ash, that has been produced from a blend of mixing powder river basin coal with lignite or bituminous coal before milling and firing in the furnace to give cementious properties without the need to add a Portland cement to obtain strength.

Note also that the specific media charge used, being ceramic in nature, determines the treatment time it takes as well as the rotational speed of the mill and charge of media versus the charge of fly ash to treat.

It will be appreciated that while the above describes the milling of fly ash pozzolan, there are other pozzolans that benefit from the subject milling technique. For instance, natural pozzolan when run through the subject milling process using the same additives has provided the same type of increase in performance in mortars/concrete.

In another embodiment, fly ash pozzolan that is produced by the Limestone power plant is used at 85% by weight of pozzolan to which is added 15% by weight of quick lime. Putting these two ingredients in the mill and rotating it for instance for 40 minutes actually pounds the lime into the surface of the pozzolan while at the same time activating the pozzolan. In addition to quicklime, one can use high dredging lime, although the quicklime appears to provide better results. It has been found that the pozzolan/quicklime mixture can be used by itself to achieve at least 100 grade concrete.

In another embodiment, having activated the pozzolan and intergrinding it with quicklime and then adding it at 4% or higher to the treated pozzolan from a separate rotary mill, one is able to replace as much as 60% of Portland cement with this mixture. The net result is that one achieves an activated pozzolan mixture that reacts on a level equal to or greater than that of ground blast furnace slag that produces slag grade 100 concrete.

In yet another embodiment, one takes a large roll mill, grinds down pozzolan to a surface area of at least 0.95 m2/g and then adds the output of the subject mill at 4 wt. % to obtain grade 100 slag. Then by grinding further to a total surface area of 1.2 m2/g or higher using the Lime additive and a high range water reducer one can reach grade 120 slag.

A further example for the production of slag grade 120 concrete takes a pozzolan with a starting surface area of 1.158 m2/g and processes it in the subject mill to arrive at a 1.986 m2/g surface area to achieve a grade 120 slag when tested using the ASTM 989 standard.

Further, other additives and further milling in addition to other additives may be used to increase the rating to slag grade 120 concrete. These include the use of a very small amount of calcium aluminate cement or, i.e. 2% by weight of pozzolan, that has been ground down with a lithium compound and then added to the pozzolanic cement. Note that in one embodiment the lithium compound is ground at 0.1% or less of the calcium aluminate to accelerate the calcium aluminate and also to add protection to any concrete structure against alkaline silica reactivity, as lithium is known to remediate alkaline silica reactivity or ASR.

Figure 2:
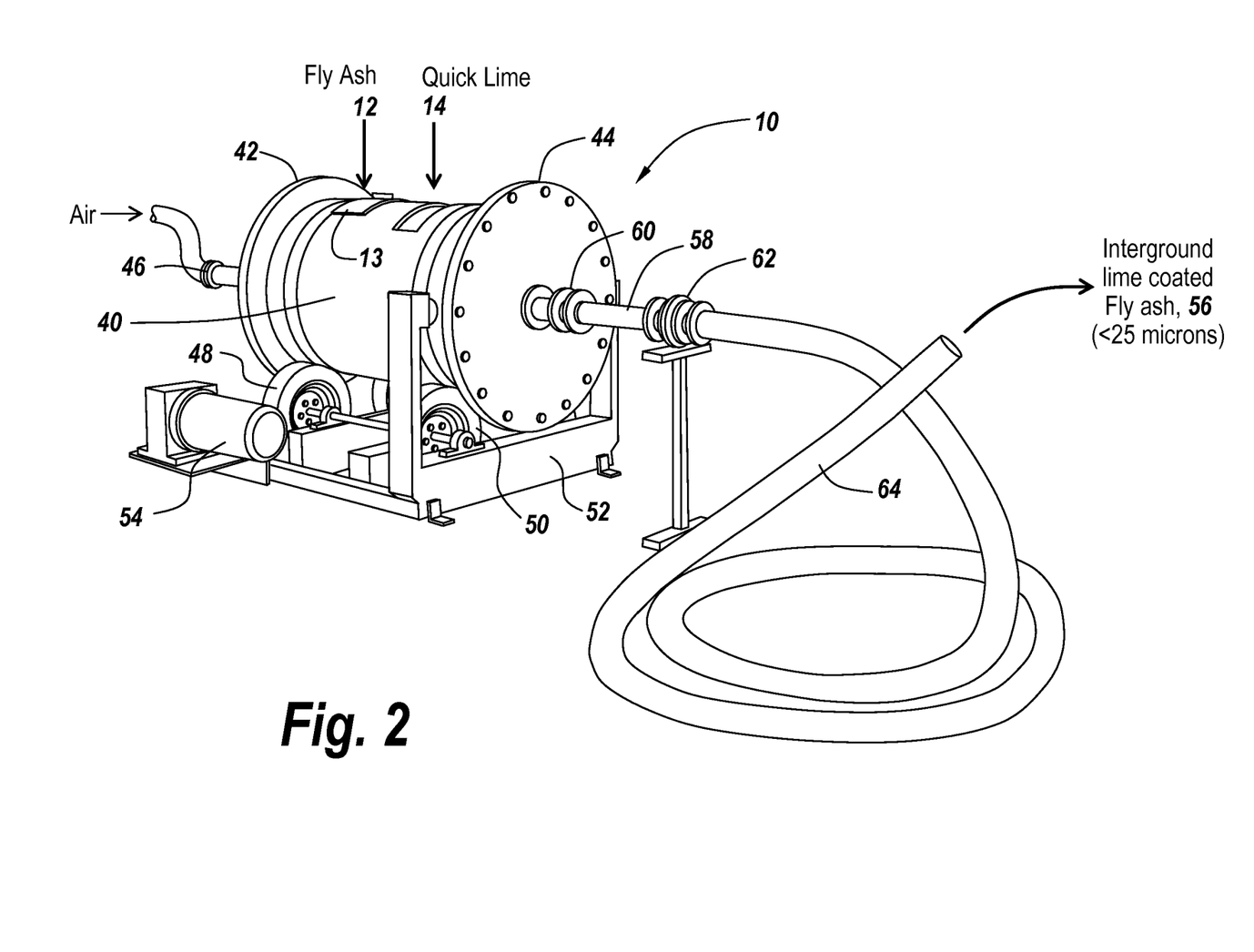
FIG. 2 is a diagrammatic illustration of the small rotary mill of FIG. 1 illustrating the introduction of ground fly ash and quick lime with the activated fly ash.

Referring now to FIG. 2, the specialized rotary mill 10 is filled with a multimedia charge. Mill 10 is shown to have a central drum 40 provided with end plates 42 and 44 that contain the pre-ground fly ash introduced into an inlet pipe 46.

Drum 40 is mounted on drive wheels 48 and 50 supported on a frame 52, with wheel 48 driven by motor 54 to rotate the drum to typically at a speed of 20-40 RPM.

As will be discussed, the differing media in the mill acts to grind the aspheric ground fly ash, while at the same time roughing up the spherical particles without crushing them so as to eject activated fly ash 56 through an outlet pipe 58 having rotary couplings 60 and 62.

Fly ash 12 is introduced into hatch 13, with the mill operated in a batch process fashion to intergrind the ground fly ash introduced at 13 with quick lime 14, in one embodiment. The typical batch processing time for processing the pre-ground fly ash is between 45 and 60 minutes, after which the drum 40 is evacuated utilizing gas pressure at pipe 46 to force the activated fly ash out through pipe 58 and line 64. The activated fly ash, while in general having a mean diameter of less than 25 microns, more specifically has a much increased surface area such as described in connection with FIG. 1.

Figure 3:
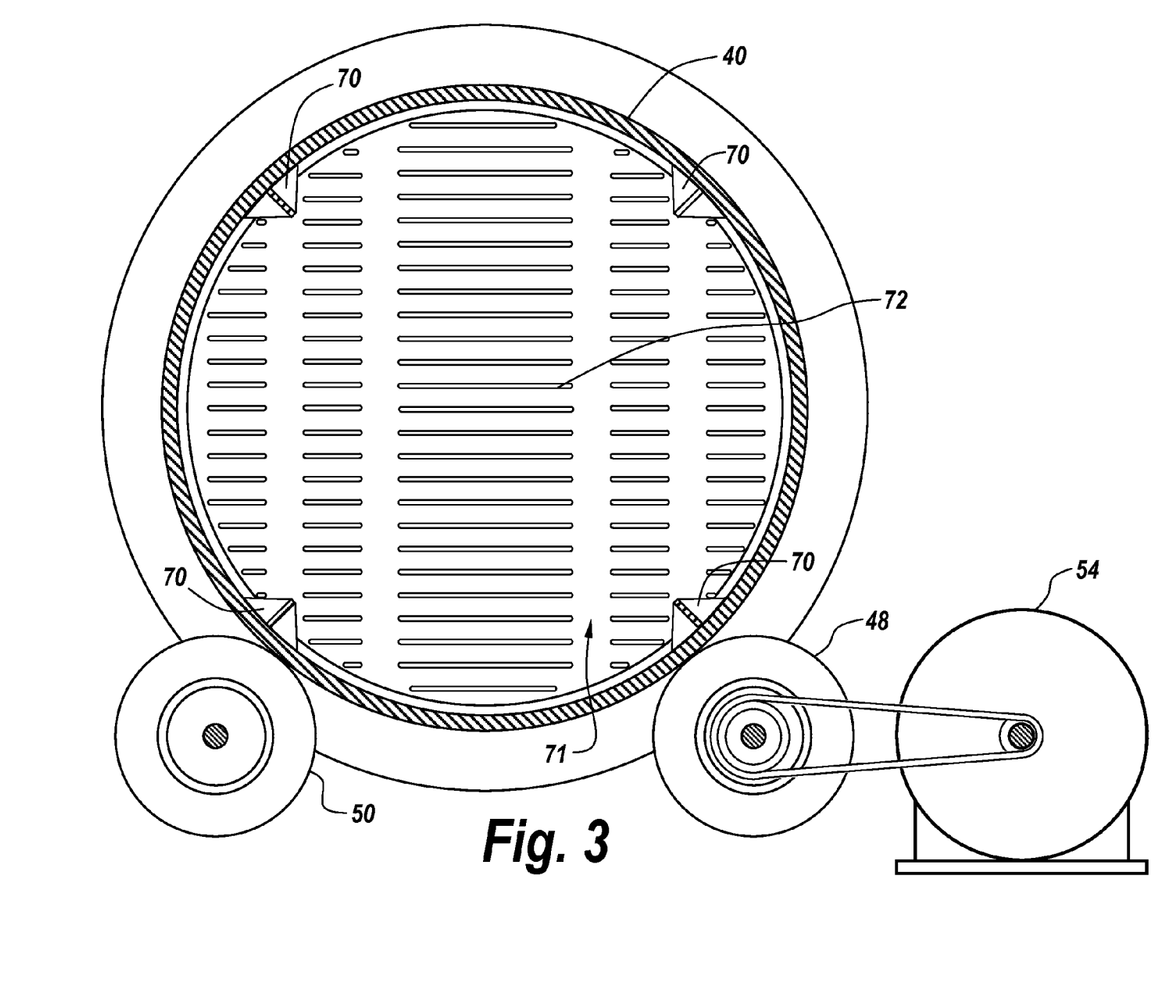
FIG. 3 is a diagrammatic illustration of one end of the rotary mill of FIG. 2 illustrating inwardly projecting mixer ribs, which can also include stubs on patterned intervals to help the mill further rough up and grind specific particles and obtain the surface area increase in a shorter amount of time, also showing a slotted exit port for the activated fly ash and, FIG. 4 is a cross sectional view of the rotary mill of FIG. 2, illustrating the multi media charge at the bottom of the mill, the flow of the material through the mill and the exit of activated fly ash from the mill.

Referring to FIG. 3, drive wheel 48 drives drum 40, with wheel 50 acting as an idler wheel. Interior to drum 40 are a number of ribs 70 that project inwardly into the interior drum 40. Also pictured is a slotted end exit plate 71 having slits 72 through which activated fly ash passes, with the slots providing a filter for the activated fly ash.

Figure 4:
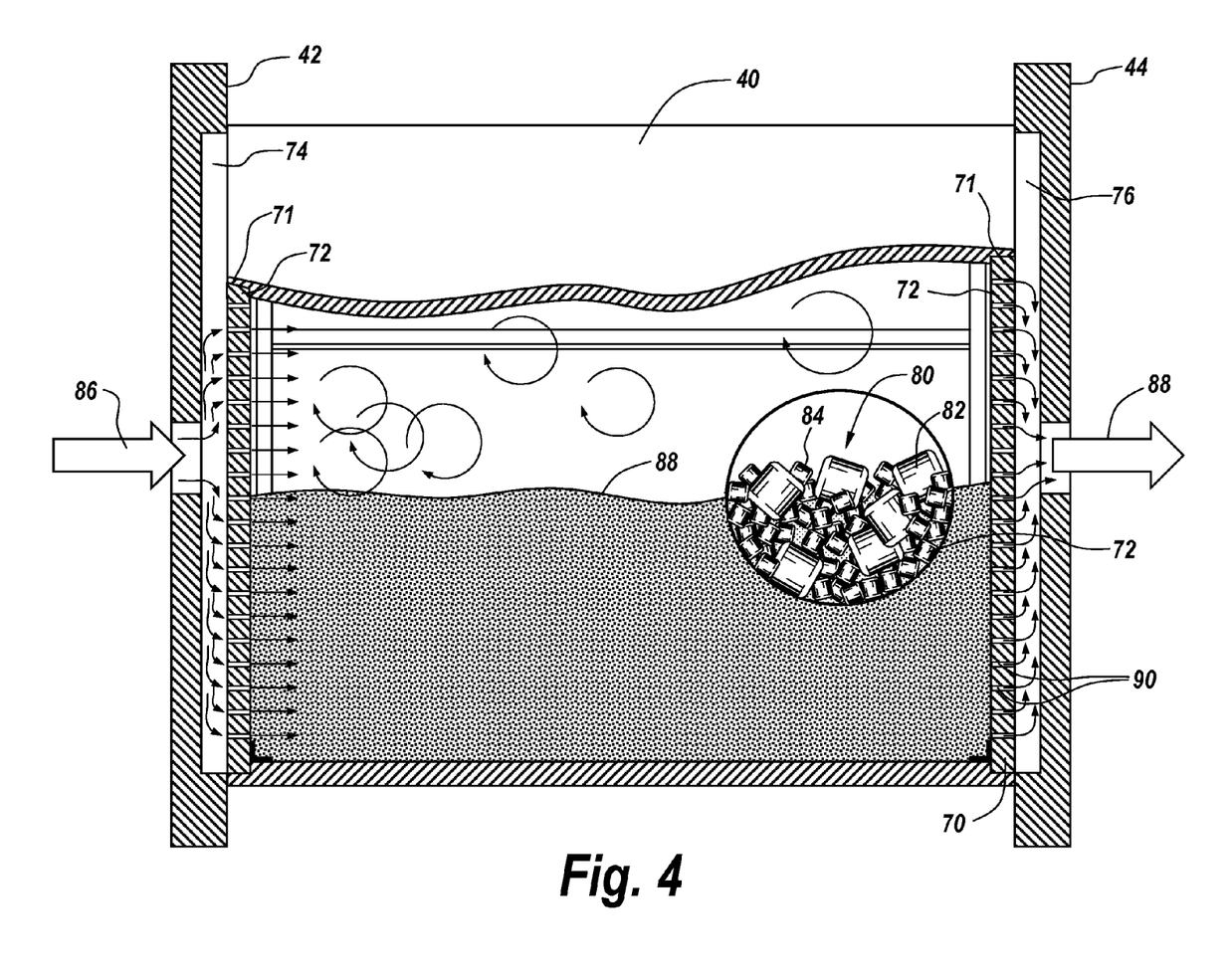

Referring to FIG. 4, drum 40 is shown with slotted plates 71 that communicate with an input plenum 74 and an output plenum 76 through end plates 42 and 44.

Drum 40 is preloaded with a tailored charge of ceramic media, here shown at 80 to include different size ceramic media 82 and 84. The formulation of which determines the amount of grinding of the fly ash introduced into drum 40 as illustrated at 86 and which occupies at least one-third of the volume of drum 40 as illustrated at 88.

In one embodiment, when the pre-ground fly ash has been ground by the subject small rotary mill for 45 minutes, the activated fly ash 88 is ejected through slits 42 in exit plate 71.

As to the constituency of the multi media, this formulation can be tailored as indicated above. For instance the formula for the media may include one-half inch cylindrical ceramic media, one-fourth inch cylindrical ceramic media, three quarter inch cone shaped ceramic media and eight millimeter beads. Also as described above, in another formulation one can use a mixture of ⅝ inch cylinders with ¾ inch cones and ⅛ inch cylinders, it being understood that there are many different media combinations may be used in combination with different types of fly ash and different residence times.

For instance, depending on the media formulation one can lower the residence time from for instance one hour to less than 45 minutes, with the media matched to the pozzolan or the fly ash being treated.

Thus the subject mill can treat multiple components differently depending on the mix of media in the mill and the configuration thereof. Specifically with respect to the treatment of pre-ground fly ash to provide activated fly ash the differently configured media acts differently on the aspheric crushed fly ash as opposed to the spherical beads. In the case of aspherical fly ash particles, they are further ground down without cracking or grinding any spherical fly ash particles. On the other hand, the spherical glass beads are polished to roughen up this surface. In both cases the surface area of the fly ash particles is increased. Thus, for the aspherical particles the increased surface area is performed by grinding, whereas for the glass beads, the increased surface area is provided by roughing up the surface of the beads.

The net result is that through the use of the specialized small rotary mill one can dramatically increase the surface area of pre-ground fly ash to activate it sufficiently to provide slag grade 100-120 performance when it is used to replace some of the Portland cement used to form concrete.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for treating fly ash so that it is usable as a substitute for Portland cement in the manufacture of concrete, comprising the step of: grinding fly ash having at least two components in a rotary mill having variably sized and shaped media such that the mill increases the surface area of the two different components of the fly ash to provide activated fly ash.

2. The method of claim 1, wherein a first component of the fly ash includes non-spherical particles and wherein a second component of the fly ash includes spherical components.

3. The method of claim 2, wherein the variably sized and shaped media reduces the size of the non-spherical components of the fly ash while polishing the surface of the spherical components of the fly ash, thus to increase the surface area of both components, and wherein the variably sized and shaped media further comprises dry processing media.

4. The method of claim 3, wherein the total surface area of the milled processed fly ash is increased by at least 30% thus to make the fly ash more reactive.

5. The method of claim 1, wherein the rotary mill intergrinds a calcium with the fly ash components.

6. The method of claim 5, wherein the calcium includes at least one of quick lime, hydrated lime, calcium carbonate, calcium formate and calcium nitrate or related calcium compound.

7. The method of claim 5, wherein the output of the rotary mill includes calcium interground with fly ash to produce calcium-coated fly ash particles.

8. The method of claim 7, wherein the interground calcium-coated fly ash particles are interground with fly ash in a subsequent intergrinding step wherein the interground calcium-coated fly ash is added at 4%-10% by weight of fly ash.

9. The method of claim 8, wherein the output of the subsequent intergrinding step results in an interground product having a surface area increased by a minimum of 30% to form activated fly ash.

10. The method of claim 9, and further including the step of replacing 50-80% by weight of Portland cement with the activated fly ash in the manufacture of concrete.

11. The method of claim 10, wherein the concrete is made by mixing the activated fly ash with aggregate, Portland cement and water.

12. The method of claim 1, and further including the step of mixing the output of the rotary mill with an additive including a high range water reducer.

13. The method of claim 12, wherein the high range water reducer is in powder form.

14. The method of claim 13, and further including the step of mixing the output of the rotary mill with calcium aluminate cement.

15. The method of claim 14, and further including mixing a lithium compound with the calcium aluminate cement.

16. The method of claim 1, wherein the fly ash in the rotary mill is interground with calcium, such that the surface area of the activated fly ash from the rotary mill is increased by a minimum of 30% to achieve slag grade 100 or better performance.

17. The method of claim 16, and further including the step of intergrinding additives that further activate the activated fly ash output of the rotary mill.

18. The method of claim 17, wherein the interground additives activate the interground fly ash so as to produce slag grade 120 performance.

19. The method of claim 18, wherein the interground additives include one of a high range water reducer, calcium aluminate cement or calcium aluminate cement mixed with a lithium compound.

20. The method of claim 19, wherein the high range water reducer is in powder form.

* * * * *